Figure 1:
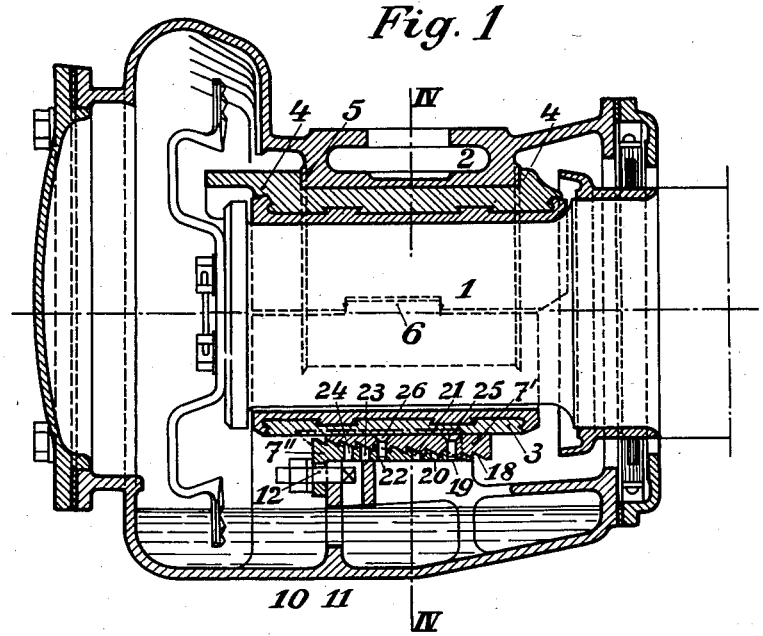

Dec. 8, 1936.  V. A. BARY  2,063,020

AXLE BEARING

Filed May 10, 1930

Inventor

Victor Alexander Bary

Patented Dec. 8, 1936

2,063,020

UNITED STATES PATENT OFFICE 2,063,020

AXLE BEARING

Victor Alexander Bary, London, England

Application May 10, 1930, Serial No. 451,399
In Great Britain May 14, 1929

9 Claims. (Cl. 308—83)

The arrangement of closed, one piece axle brasses on axle journals having removable collars in one piece axle boxes is known; this arrangement possesses the advantages which are necessarily associated with a closed axle brass, namely smoth and certain running of the brass on the journal, so that it is pre-eminently suitable for use in axle boxes on passenger vehicles. The arrangement has however the disadvantage that the collar must be removable in order to be able to fit the closed, one piece tubular brass on to the journal. Owing to this necessity the possibility of fitting one piece, closed brasses on all journals with fixed collars is in the first place excluded. Further the necessity for arranging a removable collar leads to a complicated construction of the bearing owing to the necessary fastening of the collar to the journal. Finally a journal having a removable collar is less reliable than a journal with a fixed collar because the arrangements for effecting the removability of and the security devices for the removable collar necessarily cause certain weaknesses in the cross section of the journal carrying the collar. The present invention enables all the advantages of closed axle brasses to be obtained without carrying with it the disadvantages of the known constructions. The invention solves the problem by dividing the closed axle brass and by carrying out both axle brasses as lubricating brasses. Divided axle brasses are known per se in the ordinary shaft bearings; in these, however, the one piece construction of the body of the bearing, which is necessary in the case of axle boxes for rail vehicles, is absent, so that the problem underlying these known arrangements was considerably simpler and could be solved by relatively simple means; the lower brass was simply placed in the body of the bearing and the upper brass in the cover of the bearing. In order to be able to fit a closed, divided axle brass on the journal in an undivided axle box, in accordance with the invention, further developments were necessary in the practical execution of the invention. In the first place the closed axle brass must be secured against axial displacement. In carrying out the invention this security is obtained for the upper brass by stops on the same which abut against the axle box, while the securing of the lower brass is effected through the agency of the upper brass namely by means of stops or abutment surfaces between the two brasses which have the effect of preventing displacement in an axial direction. In order that, in spite of these stops being fitted on the upper brass, the latter or the axle box can be brought into its final position, special means must be provided. According to the invention the axle box is provided with an aperture below the centre of the journal, said aperture being wider than the width of the segmental stops of the upper brass. Advantageously the width of said aperture corresponds to the width of the lower brass. This does away with the necessity to place the lower brass in position together with the upper brass. Whereas in the previous arrangements the axle brass, inverted through 180° had first to be inserted in the axle box in the axial direction, through an aperture left in the axle box and having the width of the segmental stops which secure the upper brass from axial displacement within the axle box, and then transferred into its end position by rotation in a circle concentric to the axis of the journal, this arrangement enables the axle brass to be inserted and removed in a simple manner, if the walls bounding the space in the axle box run parallel to one another below the upper brass at a distance apart which corresponds to the outer diameter of the body of the upper brass outside the stops, so that the upper brass can be introduced through the space in the axle box and can be transferred into its end position by simply pushing it in. In this case the lower brass is preferably provided with lateral fitting surfaces which bear against the walls of the axle box which bound the space in the axle box so that lateral shocks on the axle brass are directly transmitted to the axle box. A further development of the invention is the following principle. Whereas previously the lower brass of divided or closed axle brasses has been used for collecting the lubricant and for conveying it back to the lubricant receptacle, the said lower axle brass has been provided with grooves and bore holes at its lowest point. In the present invention on account of the construction of the lower axle brass as lubricating brass all bore holes are omitted, so that it is possible to support the lower axle brass. The supporting member may at the same time secure the lower lubricating brass and also the upper brass against axial displacement within the axle box, but may also serve as filling piece in constructions of that kind whereby the lower brass can be shifted in radial direction to the axle journal, when the said lower lubricating brass has been brought into its end position. Finally, as will be explained later on, the supporting member may serve to adjust the lower brass to different diameters of the axle journal. Preferably the fitting piece is arranged below the lower brass in the space in the axle box and transmits the vertical shocks directly to the axle box. Since the said space must itself be present in order to enable the parts of the axle brass to be inserted and removed, the arrangement of the member for securing the axle brass, therefore does not cause any further weakening or aperturing of the axle box than is necessary for other reasons. The fitting piece is preferably received between the lower brass and the axle box by sliding it in and is fixed to the axle box in its end position, for example by means of a flange, a rib on the axle box and a square headed bolt.

By this means the axle brass is relieved from all shocks. The lateral shocks are transmitted directly to the axle box through lateral fitting surfaces, while the vertical shocks according to their direction, are transmitted through the upper brass to the axle box or through the lower brass and the fitting piece to the same.

It has already been mentioned that the lower brass is arranged adjustably with respect to various diameters of the axle journal resulting from wear and subsequent machining. The adjustability has hitherto been effected by inserting separate pieces of different thicknesses between the axle brass and the parts of the axle box by which it is carried. These arrangements have the disadvantage that several pieces of different thicknesses must always be kept in stock. It has also been proposed to adjust the axle brass by means of bolts or studs, which are screwed by means of their threads into the axle brass or into the axle box. Such arrangements have the disadvantage that the threads work loose owing to the continual shocks to which they are subjected, so that the adjustment cannot be made with the necessary degree of exactitude. The present invention overcomes these difficulties of the known arrangements by effecting the adjustment by an alteration in the thickness of the fitting piece by which the axle brass is supported on the axle box. That is to say a necessary part of the axle bearing which must itself be present is employed for effecting the adjustability by altering its thickness. Thus separate parts, such as inserting pieces or the like, which are required only for the purpose of adjustment are entirely eliminated, and there is the further advantage that, even when subjected to shocks, no alteration in the part receiving them occurs so that the necessary fineness in the degree of adjustability is ensured. Preferably the alteration in the thickness of the fitting piece is effected by making it of two parts which are in connection along slanting divisional surfaces, and can be fixed relatively one to the other in various positions. In particular the inclined partition surfaces may be provided with projections, teeth, steps, undulations, indentations or the like, by which the relative position of the parts of the fitting piece is fixed in the position of support without other means. In order to adjust the axle brass it is only necessary to remove the fitting piece from the bearing and to displace the parts which are in connection along the slanting partition surface through one or more undulations, teeth, steps, indentations or the like and then to re-insert the fitting piece. In order that on the one hand the position of the parts of the fitting piece remains the same even when taken out and on the other hand the parts of the fitting piece are prevented from being unintentionally displaced relatively to one another when the fitting piece is in position, the separate parts of the fitting piece are provided with holes arranged transversely to the inclined surface in which bolts, for securing the parts in a fixed relative position can be received. Preferably the holes are arranged in at least one of the parts of the fitting piece at such distances one from another that the play between the axle brass and the journal which can occur before the next alteration in the thickness of the fitting piece does not exceed a definite maximum amount.

Figure 2:
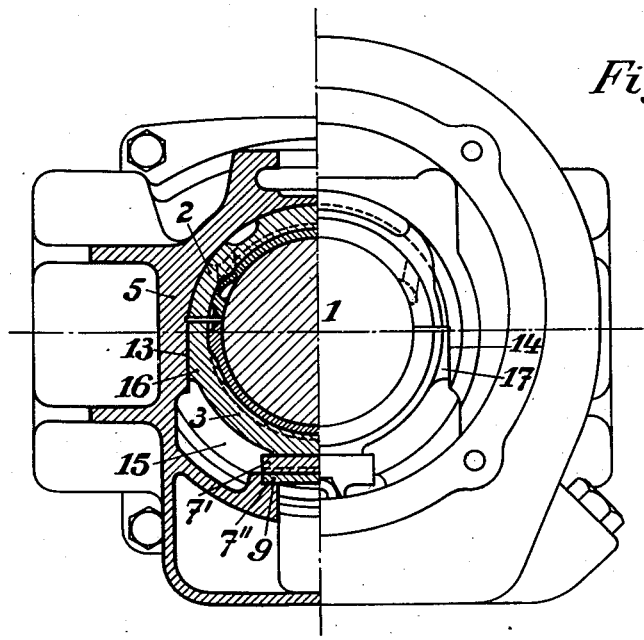

A constructional embodiment of the invention is illustrated by way of example in the accompanying drawing, in which Fig. 1 is a longitudinal section through an axle bearing;

Fig. 2 shows on its left hand half a cross section on the line II—II of Fig. 1; the right hand half of Fig. 2 is a front elevation of the axle bearing.

Referring to the drawing, in both figures 1 represents the axle journal, 2 the upper brass and 3 the lower brass. The upper brass is secured against displacement in the axial direction by means of stops 4 which abut directly against the axle box 5 and transmit the axial shocks thereto. The lower brass is provided with rib like projections 6 which engage in the upper brass and it is secured against displacement in the axial direction by means of these projections indirectly through the upper brass. According to the invention the lower brass 3 is constructed as lubricating brass, this brass which is perfectly closed, is mounted upon the journal with such a little play, that a lubricating film can be formed between the brass and the journal. It is therefor possible to support the lower brass in an advantageous kind of way. For this purpose a fitting piece 7 is arranged inside the space 8 which enables the axle brass to be inserted and removed in a manner which is hereinafter explained in greater detail. The fitting piece 7 is received in the axle box 5 by sliding it in at 9 and is fixed to the axle box in its end position by means of a flange 10, a rib 11 on the axle box and the square headed bolt 12. Thus, in accordance with the invention, securing members, which weaken the axle brass and axle box and pierce the latter are not longer needed.

According to a further development of the invention the walls 13 and 14 which bound the space or cut out portion of the axle box are constructed so as to be parallel one to the other below the upper brass 2 and separated by a distance which corresponds to the outer diameter of the upper brass 2 outside the stops 4, so that the upper brass can be introduced into the axle box through the aperture 15 in the latter and transferred into its end position by simply sliding it in. The lower brass 3 is provided with lateral fitting surfaces 16 and 17 which bear against the walls 13, 14 of the axle box 5 which bound the aperture or cut out portion of the latter so that lateral shocks on the axle brass are directly transmitted to the axle box 5. The fitting piece 7 is again also arranged inside the space 15 and is introduced by sliding it in at 9 and fastened to the axle box 5 by means of the members 10, 11, 12. The insertion and removal of the axle brass is particularly simple because the awkward introduction of the upper brass into its final position by rotation through an angle of 180° is eliminated. The fitting surfaces 16, 17 have the advantage that lateral shocks are transmitted to the axle box by the lower brass which is subjected to purely compressive stresses, while the axle box also takes the vertical shocks directly from the upper brass and indirectly from the lower brass through the fitting piece 7.

The lower brass 3 needs to be adjustable with respect to the journal 1 because the diameter of the latter decreases in use by wear and subsequent machining (turning and polishing). Whereas the upper brass 2 always automatically rests on the journal 1, the lower brass 3 needs to be adjusted in order to maintain the air space between it and the journal 1 at such a distance that on the one hand a sufficiently good film of lubricant can be formed and on the other hand so that the space left between the journal and the brass across which shocks can be given is not too great.

In accordance with the invention and in order to secure this necessary adjustment, the fitting piece 7 consists of two parts 7' and 7'' which are in connection along an inclined partition surface. The inclined partition surface is provided with indentations 18. Whereas in Fig. 1 the full lines show the position of the parts 7' and 7'' corresponding to the least thickness of the fitting piece, the dotted lines show a position which the fitting piece assumes on displacing the two parts relatively by one indentation. Thus the thickness of the fitting piece increases by an amount depending on the inclination of the partition surface and the distance displaced so that the axle brass can be adjusted by this amount after the fitting piece has been removed and its separate parts have been displaced in the manner just described. The separate parts 7' and 7'' of the fitting piece are also provided with holes 19, 20, 21 and 22, 23, 24 respectively arranged transversely to the partition surface the distance apart of which is so chosen that the possible play between the axle brass and the journal before the next alteration in the thickness of the fitting piece does not exceed a pre-determined maximum value. The relative position in which the parts 7' and 7'' have been set can be maintained by means of the bolts 25 and 26. The maximum alteration in the thickness of the fitting piece corresponds to the largest amount by which it is allowable for the diameter of the journal to be reduced. By means of the inclination of the partition surfaces and by arranging a suitable number of indentations 18 it becomes possible to make a sufficiently fine adjustment in the thickness of the fitting piece and therefore a sufficiently fine adjustment of the axle brass.

In order to allow the superfluous lubricant not used for the formation of the lubricating film to flow back to the lubricant receptacle, the end of the lower brass opposite to the axle collar, is set back with respect to the upper brass.

I claim:

1. An axle bearing for railway vehicles, comprising, in combination, an axle journal having a non-removable collar thereon, a bearing brass assembly including an upper loaded and a lower unloaded brass and arranged about said journal and encircling the same, a one-piece axle box for housing the brass assembly and the journal, means for supplying lubricant to said brass assembly from above, means for securing the upper brass in the box, the lower brass being separate from the upper brass and movable relatively to the journal and having a continuous unbroken bearing surface, there being a space between the lower brass and the bottom of the box for enabling the lower brass to be moved inwardly and outwardly past the fixed collar, and means for holding the lower brass at such a small distance from the journal that such brass applies lubricant thereto and serves also to transmit vertical forces from the journal to the axle box upon downward movement of the journal relatively to the box, whereby said brasses will be buttressed on all sides against said box, limiting the movements of the journal and preventing jumping thereof and the resulting severe impacts and shock, the spacing between the lower brass and the journal being so limited that a lubricant film will completely fill said space, both while the journal is rotating and while it is standing still.

2. An axle bearing for railway vehicles, comprising, in combination, an axle journal having a non-removable collar thereon, a bearing brass assembly including an upper loaded and a lower unloaded brass, an axle box for housing said bearing, and means for securing said brasses in said box, said lower brass being separate from and movable relatively to the upper brass and to the journal and having a continuous, unbroken surface and adapted to receive said journal in the manner of a lubricating brass, there being a space between the lower brass and the bottom of the box for enabling the lower brass to be moved inwardly and outwardly past the fixed collar, and means for holding the lower brass at such a small distance from the journal that such brass applies lubricant thereto and serves also to transmit vertical forces from the journal to the axle box upon downward movement of the journal relatively to the box, whereby said brasses will be buttressed on all sides against said box, limiting the movements of the journal and preventing jumping thereof and the resulting severe impacts and shock, the spacing between the lower brass and the journal being so limited that a lubricant film will completely fill said space, both while the journal is rotating and while it is standing still.

3. An axle bearing suitable for railway vehicles, comprising, in combination, an axle journal having a non-removable collar thereon, a bearing brass composed of at least two parts arranged about said journal and encircling the same, a one-piece axle box, and means for securing the bearing brasses in the box, the lower brass of said brasses having a continuous unbroken bearing surface and adapted to receive said journal and act as a lubricating brass, a supporting member between the lower brass and the axle box and adapted to buttress the lower brass against the box, and means operable to vary the thickness of said supporting member while maintaining the parallelism of its contacting surfaces.

4. An axle bearing suitable for railway vehicles, comprising, in combination, an axle journal having a non-removable collar thereon, a bearing brass composed of at least two parts arranged about said journal and encircling the same, a one-piece axle box, and means for securing the bearing brasses in the box, the lower brass of said brasses having a continuous unbroken bearing surface and adapted to receive said journal and act as a lubricating brass, a supporting member between the lower brass and the axle box composed of a plurality of parts, said parts having interlocking teeth at their abutting surfaces inclined with respect to the surfaces of the brass and axle box contacted by such member, said parts adjustable with respect to each other, and means for fixing such parts in adjusted position.

5. An axle bearing suitable for railway vehicles, comprising, in combination, an axle journal having a non-removable collar thereon, a bearing brass composed of at least two parts arranged about said journal and encircling the same, a one-piece axle box, and means for securing the bearing brasses in the box, the lower brass of said brasses having a continuous unbroken bearing surface and adapted to receive said journal and act as a lubricating brass, a supporting member between the lower brass and the axle box composed of a plurality of parts, the abutting surfaces of said parts being inclined with respect to the surfaces of the brass and axle box contacted by such member, bores in the said parts of said member transverse to such abutting surfaces, and bolts passing through aligned openings in adjacent parts to hold the same in adjusted position.

6. An axle bearing suitable for railway vehicles, comprising, in combination, an axle journal having a non-removable collar thereon, a bearing brass composed of at least two parts arranged about said journal and encircling the same, a one-piece axle box, and means for securing the bearing brasses in the box, the lower brass of said brasses having a continuous unbroken bearing surface and adapted to receive said journal and act as a lubricating brass, a supporting member between the lower brass and the axle box composed of a plurality of parts, the abutting surfaces of said parts being inclined with respect to the surfaces of the brass and axle box contacted by such member, bores in the said parts of said member transverse to such abutting surfaces, and bolts passing through aligned openings in adjacent parts to hold the same in adjusted position, the distance between adjacent bores being such that the play between the journal and the lower brass before the next change in thickness of the supporting member does not exceed a predetermined maximum.

7. An axle bearing suitable for railway vehicles, comprising, in combination, an axle journal having a non-removable collar thereon, a one-piece axle box, an upper loaded brass resting upon said journal, and a lower unloaded brass separate from the upper brass and lying against the lower crown of the journal, said lower brass being movable independently of the upper brass and relatively to the journal, the spacing between the lower brass and the journal being so limited that a layer of lubricant will occupy said space, both while the journal is rotating and while it is standing still, the said lower brass thereby serving as a lubricating brass and having an uninterrupted bearing surface, there being a space between the lower brass and the bottom of the box, and means in said space for supporting the lower brass upon its bottom surface at the middle thereof.

8. An axle bearing suitable for railway vehicles, comprising, in combination, an axle journal having a non-removable collar thereon, an axle box, an upper loaded brass resting upon said journal, a lower unloaded brass separate from the upper brass and lying against the lower crown of the journal, said lower brass being movable independently of the upper brass and relatively to the journal, the spacing between the lower brass and the journal being so limited that a layer of lubricant will occupy said space, both while the journal is rotating and while it is standing still, the said lower brass thereby serving as a lubricating brass, there being a space between the lower brass and the bottom of the box, and means for adjusting the lower brass relatively to the axle journal and for securing such brass in adjusted position, said means being located wholly within the axle box and within said space and being operable from within the box, so that said box is free of perforations designed to accommodate said means.

9. An axle bearing for railway vehicles, comprising, in combination, an axle journal having a non-removable collar thereon, a one-piece axle box, an upper loaded brass resting upon said journal, a lower unloaded brass separate from the upper brass and lying against the lower crown of the journal, said lower brass being movable independently of the upper brass and relatively to the journal, the spacing between the lower brass and the journal being so limited that a layer of lubricant will occupy said space, both while the journal is rotating and while it is standing still, the said lower brass thereby serving as a lubricating brass, means for adjusting the lower brass relatively to the journal, said lower brass contacting at its sides the walls of the axle box along surfaces parallel to the direction of adjustment, so that contact between the lower brass and the axle box is maintained throughout all adjustments of the brass, there being a space between the lower brass and the bottom of the box for enabling the brass to be inserted and removed, said adjusting means being located wholly within said space and being operable from within the box so that said box is free of perforations in the walls thereof for accommodating the adjusting means, whereby said brasses will be buttressed on all sides against said box, limiting the movements of the journal and preventing jumping thereof and the resulting severe impacts and shock.

VICTOR ALEXANDER BARY.